United States Patent [19]
Ebara et al.

[11] Patent Number: 5,023,223
[45] Date of Patent: Jun. 11, 1991

[54] PROCESS FOR PRODUCING HIGHLY STEREOSPECIFIC ALPHA-OLEFIN POLYMERS

[75] Inventors: Takeshi Ebara; Toshio Sasaki, both of Ichihara; Kiyoshi Kawai, Chiba, all of Japan

[73] Assignee: Sumitomo Chemical Company, Limited, Osaka, Japan

[21] Appl. No.: 448,285

[22] Filed: Dec. 11, 1989

[30] Foreign Application Priority Data

Dec. 16, 1988 [JP] Japan .................... 63-319145

[51] Int. Cl.$^5$ .............................................. C08F 4/60
[52] U.S. Cl. .................................. 502/116; 502/125; 502/127
[58] Field of Search ................... 502/116, 125, 127

[56] References Cited

U.S. PATENT DOCUMENTS

| 4,672,050 | 6/1987 | Sasaki et al. | 502/116 |
| 4,780,443 | 10/1988 | Matsuura | 502/127 |
| 4,784,983 | 11/1988 | Mao et al. | 502/127 |
| 4,816,433 | 3/1989 | Terano | 502/127 |
| 4,822,763 | 4/1989 | Matsuura et al. | 502/127 |

FOREIGN PATENT DOCUMENTS

| 0045975 | 2/1982 | European Pat. Off. |
| 0115195 | 8/1984 | European Pat. Off. |
| 0196585 | 10/1986 | European Pat. Off. |
| 0244678 | 11/1987 | European Pat. Off. |
| 61-78803 | 4/1986 | Japan |
| 2111066 | 6/1983 | United Kingdom |

Primary Examiner—Patrick P. Garvin
Assistant Examiner—E. D. Irzinski
Attorney, Agent, or Firm—Stevens, Davis, Miller & Mosher

[57] ABSTRACT

A process for producing a highly stereospecific α-olefin polymer which comprises homopolymerizing or copolymerizing an α-olefin or copolymerizing an α-olefin with ethylene by the use of a catalyst system comprising:

(A) a solid catalyst component containing a trivalent titanium compound obtained by reducing a titanium compound represented by the following general formula:

$$Ti(OR^1)_n X_{4-n}$$

($R^1$ represents a hydrocarbon group having 1 to 20 carbon atoms, X represents a halogen atom and n represents a number satisfying $0 < n \leq 4$) with an organomagnesium compound in the presence of an organic silicon compound having Si—O bond to obtain a solid product, followed by treating the solid product with an ester compound and thereafter treating the ester-treated solid product with a mixture of an ether compound and titanium tetrachloride or a mixture of an ether compound, titanium tetrachloride and an ester compound, (B) an organoaluminum compound, and
(C) a silicon compound represented by the following general formula:

$$R^2 R^3 Si(OR^4)_2$$

($R^2$ represents an alicyclic hydrocarbon group having 5 to 20 carbon atoms, $R^3$ represents an acyclic hydrocarbon group having 2 to 12 carbon atoms, and $R^4$ represents a hydrocarbon group having 1 to 20 carbon atoms).

21 Claims, 1 Drawing Sheet

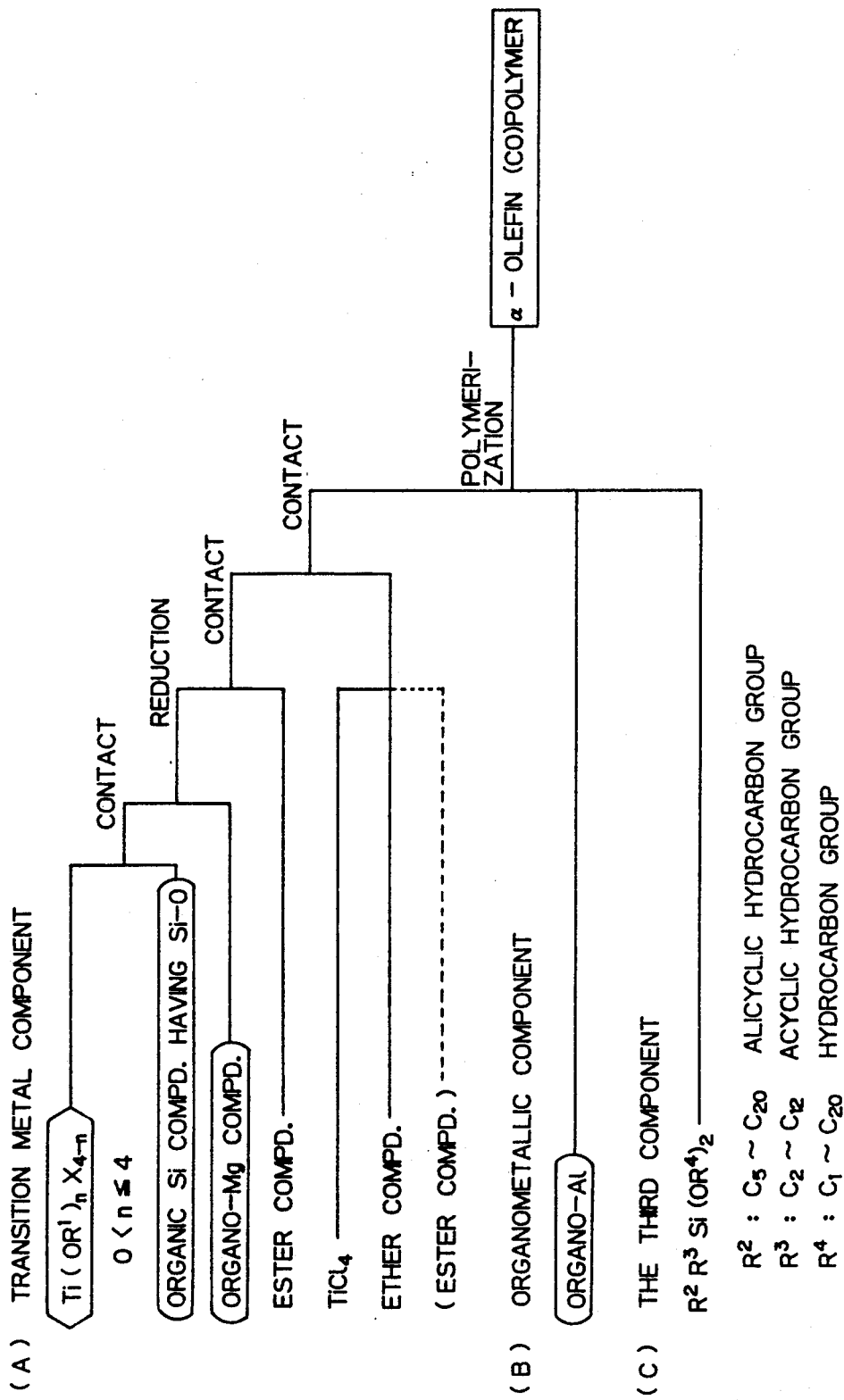

PROCESS FOR PRODUCING HIGHLY STEREOSPECIFIC ALPHA-OLEFIN POLYMERS

BACKGROUND OF THE INVENTION

1. Field of the Invention

This invention relates to a process for producing highly stereospecific α-olefin polymers. More particularly, this invention relates to a process for producing highly stereospecific α-olefin polymers quite low in the contents of catalyst residue and amorphous polymer and excellent in mechanical properties and processability by the use of a novel catalyst system having a very high catalyst activity per solid catalyst and per titanium atom.

2. Description of the Prior Art

As the method for producing a polymer of α-olefin such as propylene, butene-1 and the like, the method using the so-called Ziegler-Natta catalyst comprising a compound of transition metal belonging to Group IV-VI of the periodic table and an organometallic compound of a metal belonging to Group I-III of the periodic table is well known.

Production of α-olefin polymer is accompanied by formation of amorphous polymer in addition to the highly stereospecific α-olefin polymer having a high industrial value. This amorphous polymer is poor in industrial value, and it exercises greatly adverse influences upon the mechanical properties of processed articles, such as molded product, film, fiber and the like, of α-olefin polymer. In addition, the formation of amorphous polymer results in a loss of starting monomer, and it necessitates to provide a particular equipment for removing the amorphous polymer, which is quite disadvantageous from the industrial point of view. Accordingly, the catalyst system used in the production of α-olefin polymer must be a catalyst system which yields no amorphous polymer at all or yields only a vry slight quantity of amorphous polymer. Further, in the α-olefin polymer produced by such a process, residue of catalyst components comprising transition metal compound and organometallic compound remains, which makes various troubles on stability, processability, etc. of the resulting α-olefin polymer. Thus, a particularly equipment must be provided for removing the catalyst residue and stabilizing the polymer.

This disadvantage can be overcome by enhancing the catalyst activity expressed by the weight of α-olefin polymer formed per unit weight of catalyst. By taking this measures, the above-mentioned equipment for removing catalyst residue becomes unnecessary and production cost of α-olefin polymer can be reduced.

It is known that a supported catalyst prepared by supporting tetravalent titanium halide on magnesium halide can realize a certain extent of high-stereospecificity, high-activity polymerization of α-olefin when used in combination with an organoaluminum compound (co-catalyst) and organic silicon compound (the third component of catalyst) [Japanese Patent Application Kokai (Laid-Open) Nos. 57-63310 (EP-A-0045975), 58-83006 (GB-2111066), 61-78803]. It is also known that, in case of composite solid catalysts prepared by reducing a tetravalent titanium compound with organomagnesium to form an eutectic crystal, a high-stereospecificity, high-activity polymerization of α-olefin can be realized by the same combination as above [Japanese Patent Application Kokai (Laid-Open) No. 61-218606 (USP 4672050)].

Although both the above-mentioned two processes have reached a level capable of realizing no-extraction, no-deashing process to a certain extent, their further improvement is desired. Concretely speaking, realization of a more highly stereospecific polymerization is particularly desired for enhancing the quality of α-olefin polymer. Particularly in the field requiring a high stiffness of polymer such as the field of molded articles, a catalyst system having an ability to form a highly stereospecific polymer (for example, a catalyst system yielding 1.1% or less of CXS in the homopolymerization of propylene, wherein CXS means cold xylene-soluble fraction in total polymer yield) is earnestly desired, because realization of high stereospecificity directly leads to a quality of high stiffness.

SUMMARY OF THE INVENTION

It is the object of this invention to provide a process for producing an α-olefin polymer of high quality and high stereospecificity by the use of an α-olefin polymerization catalyst system having so high catalyst activity and stereospecificity as to make the removal of catalyst residue and amorphous polymer unnecessary.

The use of the catalyst system of this invention brings about the following effects:

(1) Since the catalyst activity per solid catalyst and per titanium atom is very high, the contents of halogen atom and titanium atom closely related to colorization, stability and corrosion behavior of polymer are very low, even if no particular treatment is effected for removing catalyst residue. That is, the equipment for removing catalyst residue is unnecessary, and production cost of olefin polymer can be reduced.

(2) Since the decrease in catalyst activity and stereospecificity in the lapse of time is very small, production of polymer per unit catalyst quantity can be enhanced by prolonging the polymerization time.

(3) By the use of the catalyst system of this invention, an α-olefin polymer having a very high stereospecificity can be produced. Accordingly, the quantity of amorphous polymer formed as by-product is very small, and therefore an α-olefin polymer excellent in mechanical properties can be produced without removing amorphous polymer.

(4) Since formation of low-stereospecificity polymer soluble in the polymerization solvent is very small, problems in process, such as deposition of polymer onto reactor, pipings and flush hopper, do not appear. Further, since formation of soluble polymer is very small, the starting monomer can be utilized effectively.

BRIEF DESCRIPTION OF THE DRAWING

FIG. 1 is a flow chart diagram for facilitating the understanding of this invention. This flow chart diagram is a mere typical example of the embodiment of this invention, and this invention is by no means limited by it.

DESCRIPTION OF THE PREFERRED EMBODIMENTS

According to this invention, there is provided a process for producing a highly stereospecific α-olefin polymer which comprises homopolymerizing or copolymerizing an α-olefin or copolymerizing an α-olefin with ethylene by the use of a catalyst system comprising:

(A) a solid catalyst component containing a trivalent titanium compound obtained by reducing a titanium compound represented by the following general formula:

$$Ti(OR^1)_n X_{4-n}$$

($R^1$ represents a hydrocarbon group having 1 to 20 carbon atoms, X represents a halogen atom and n represents a number satisfying $0 < n \leq 4$) with an organomagnesium compound in the presence of an organic silicon compound having Si—O bond to obtain a solid product, followed by treating the solid product with an ester compound and thereafter treating the ester-treated solid product with a mixture of an ether compound and titanium tetrachloride or a mixture of an ether compound, titanium tetrachloride and an ester compound, (B) an organoaluminum compound, and (C) a silicon compound represented by the following general formula:

$$R^2 R^3 Si(OR^4)_2$$

($R^2$ represents an alicyclic hydrocarbon group having 5 to 20 carbon atoms, $R^3$ represents an acyclic hydrocarbon group having 2 to 12 carbon atoms, and $R^4$ represents a hydrocarbon group having 1 to 20 carbon atoms).

By the use of the catalyst system of this invention, the above-mentioned object, particularly a high-stereospecificity polymerization, can be achieved.

Hereunder, this invention will be illustrated more concretely.

(a) Titanium compound

The titanium compound used in this invention is represented by the following general formula:

$$Ti(OR^1)_n X_{4-n}$$

($R^1$ represents a hydrocarbon group having 1 to 20 carbon atoms, X represents a halogen atom, and n represents a number satisfying $0 < n \leq 4$).

Concrete examples of $R^1$ include alkyl groups such as methyl, ethyl, propyl, isopropyl, butyl, isobutyl, amyl, isoamyl, hexyl, heptyl, octyl, decyl, dodecyl and the like; aryl groups such as phenyl, cresyl, xylyl, naphthyl and the like; cycloalkyl groups such as cyclohexyl, cyclopentyl and the like; allyl groups such as propenyl and the like; and aralkyl groups such as benzyl and the like. Among these groups, alkyl groups having 2 to 18 carbon atoms and aryl groups having 6 to 18 carbon atoms are preferable, and straight chain alkyl groups having 2 to 18 carbon atoms are particularly preferable. It is also possible to use a titanium compound having two or more different $OR^1$ groups.

Examples of the halogen atom represented by X include chlorine, bromine and iodine, among which chlorine give a particularly good result.

In the titanium compound represented by Ti$(OR^1)_n X_{4-n}$, the value n must satisfy $0 < n \leq 4$, preferably $2 \leq n \leq 4$, and particularly n=4.

As the method for synthesizing the titanium compound represented by Ti$(OR^1)_n X_{4-n}$ ($0 < n \leq 4$), known methods can be adopted. For example, a method of reacting Ti$(OR^1)_4$ and TiX$_4$ at a specified ratio, or a method of reacting TiX$_4$ with a specified quantity of corresponding alcohol can be adopted.

(b) Organic silicon compound having Si—O bond

The organic silicon compounds having Si—O bond used in the synthesis of the solid catalyst component of this invention include those represented by the following general formulas:

$$Si(OR^5)_m R^6_{4-m}$$

$$R^7(R^8_2 SiO)_p SiR^9_3$$

$$(R^{10}_2 SiO)_q$$

where $R^5$ represents a hydrocarbon group having 1 to 20 carbon atoms, $R^6$, $R^7$, $R^8$, $R^9$ and $R^{10}$ each represents a hydrocarbon group having 1 to 20 carbon atoms or hydrogen atom, m represents a number satisfying $0 < m \leq 4$, p represents an integer of 1 to 1,000, and q represents an integer of 2 to 1,000.

Concrete examples of said organic silicon compound include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, phenylhydropolysiloxane, and the like.

Among these organic silicon compounds, alkoxysilane compounds represented by general formula Si$(OR^5)_m R^6_{4-m}$ are preferable, wherein m preferably satisfies $1 \leq m \leq 4$ and particularly m=4.

(c) Organomagnesium compound

Next, as the organomagnesium compound of this invention, any types of organomagnesium compounds having magnesium-carbon bond can be used. Particularly, Grignard compounds represented by general formula $R^{11}$MgX ($R^{11}$ represents a hydrocarbon group having 1 to 20 carbon atoms and X represents a halogen atom) and dialkylmagnesium compounds and diarylmagnesium compounds represented by general formula $R^{12}R^{13}$Mg ($R^{12}$ and $R^{13}$ are represents a hydrocarbon group having 1 to 20 carbon atoms) are preferable. In these formulas, $R^{11}$, $R^{12}$ and $R^{13}$ may be identical or different, and they each represents alkyl, aryl, aralkyl or alkenyl group having 1 to 20 carbon atoms such as methyl, ethyl, propyl, isopropyl, butyl, sec-butyl, tert-butyl, amyl, isoamyl, hexyl, octyl, 2-ethylhexyl, phenyl, benzyl and the like.

Concrete examples of said Grignard compound include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride tert-butylmagnesium bromide, amylmagnesium chloride, isoamylmagnesium chloride, phenylmagnesium chloride, phenylmagnesium bromide and the like. Concrete examples of the compound represented by $R^{12}R^{13}$Mg include diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, diphenylmagnesium and the like.

The solvents usable in the synthesis of the abovementioned organomagnesium compounds include ether solvents such as diethyl ether, dipropyl ether, diisopropyl ether, dibutyl ether, diisobutyl ether, diamyl ether, diisoamyl ether, dihexyl ether, dioctyl ether, diphenyl ether, dibenzyl ether, phenetole, anisole, tetrahydrofuran, tetrahydropyran and the like. Hydrocarbon solvents such as hexane, heptane, octane, cyclohexane, methylcyclohexane, benzene, toluene, xylene and the like are also usable. Mixtures of these ether solvents and hydrocarbon solvents are also usable. The organomagnesium compound is preferably used in the state of a solution in an ether compound. As said ether compound, ether compounds having 6 or more carbon atoms in molecule and ether compounds having a cyclic structure are used.

From the viewpoint of catalyst performance, it is particularly preferable to use a Grignard compound represented by $R^{11}MgCl$ in the state of a solution in ether compound.

Hydrocarbon-soluble complex compounds formed between the above-mentioned organomagnesium compounds and an organometallic compound are also usable. Examples of said organometallic compound include organic compounds of Li, Be, B, Al and Zn.

(d) Ester compound

The ester compounds which can be used in this invention are esters of monobasic and polybasic carboxylic acids including aliphatic carboxylic esters, olefinic carboxylic esters, alicyclic carboxylic esters and aromatic carboxylic esters.

Concrete examples of said ester compound include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, dipropyl phthalate, diisopropyl phthalate, dibutyl phthalate, diisobutyl phthalate, diheptyl phthalate, dioctyl phthalate, diphenyl phthalate and the like.

Among these ester compounds, olefinic carboxylic esters such as methacrylic esters, maleic esters and the like and phthalic esters are preferable, and phthalic diesters are particularly preferable.

(e) Ether compounds

Next, the ether compounds which can optionally be used in this invention include dialkyl ethers such as diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether, ethyl isobutyl ether and the like. Among them, dibutyl ether and diisoamyl ether are particularly preferable.

(f) Synthesis of solid catalyst component

The solid catalyst component of this invention is synthesized by reducing a titanium compound with an organomagnesium compound in the presence of an organic silicon compound to form a solid product, followed by treating the solid product with an ester compound and thereafter treating the ester-treated solid product with a mixture of an ether compound and titanium tetrachloride or a mixture of an ester compound, an ether compound and titanium tetrachloride.

All the synthetic reactions are carried out in the atmosphere of inert gas such as nitrogen, argon or the like.

As the method for reducing a titanium compound with an organomagnesium compound (the first step of the synthesis), a method which comprises adding an organomagnesium compound to a mixture of titanium compound and organic silicon compound can be referred to. An inverse method which comprises adding a mixture of titanium compound and organic silicon compound to a solution of organomagnesium compound is also adoptable. Among these methods, the method which comprises adding an organomagnesium compound to a mixture of titanium compound and organic silicon compound is more preferable from the viewpoint of catalyst activity.

Preferably, the titanium compound and the organic silicon compound are put to use after dissolving them into an appropriate solvent or diluting them with an appropriate solvent.

As the solvent used for this purpose, aliphatic hydrocarbons such as hexane, heptane, octane, decane and the like, aromatic hydrocarbons such as toluene, xylene and the like, alicyclic hydrocarbons such as cyclohexane, methylcyclohexane, decalin and the like, and ether compounds such as diethyl ether, dibutyl ether, diisoamyl ether, tetrahydrofuran and the like can be referred to.

Temperature of the reduction is $-50°$ C. to $70°$ C. If the temperature of reduction is too high, catalyst activity is deteriorated.

In synthesizing a solid product by the reduction, it is also possible to carry out the reduction in the presence of a porous material such as inorganic oxide, organic polymer and the like. By this, the formed solid product can be impregnated into the porous material.

As said porous material, materials having a pore volume of 0.3 ml/g or above in the pore radius region of 200 to 2,000 angstroms and a mean particle diameter of 5 to 300 microns are preferable.

As said porous inorganic oxide, $SiO_2$, $Al_2O_3$, $MgO$, $TiO_2$, $ZrO_2$, $SiO_2 \cdot Al_2O_3$, $MgO \cdot Al_2O_3$, $MgO \cdot SiO_2 \cdot Al_2O_3$ and the like can be referred to.

As said porous organic polymer, polystyrene type, polyacrylic ester type, polymethacrylic ester type, polyacrylonitrile type, polyvinyl chloride type and polyolefin type polymers can be referred to, and their typical examples include polystyrene, styrene-divinylbenzene copolymer, styrene-N,N'-alkylenedimethacrylamide copolymer, styrene-ethylene glycol dimethacrylic acid methyl ester copolymer, polymethyl acrylate, polyethyl acrylate, methyl acrylate-divinylbenzene copolymer, ethyl acrylate-divinylbenzene copolymer, polymethyl methacrylate, methyl methacrylate-divinylbenzene copolymer, polyethylene glycol dimethacrylic acid methyl ester, polyacrylonitrile, acrylonitrile-divinylbenzene copolymer, polyvinyl chloride, polyvinylpyrrolidine, polyvinylpyridine, ethylvinylbenzene-divinylbenzene copolymer, polyethylene, ethylene-methyl acrylate copolymer, polypropylene and the like. Among these porous materials, $SiO_2$, $Al_2O_3$ and polystyrene type polymers are preferable.

Although the period of dropping is not critical, it is usually in the range from about 30 minutes to about 6 hours. After completion of the reduction, a post reaction may optionally be carried out additionally at a temperature of $20°$ C. to $120°$ C.

The organic silicon compound is used in an amount of 1 to 50, preferably 3 to 30, and particularly 5 to 25, as expressed in terms of atomic ratio of silicon atom to titanium atom (Si/Ti).

The organomagnesium compound is used in an amount of 0.1 to 1.0, preferably 0.2 to 5.0, and particularly 0.5 to 2.0, as expressed in terms of atomic ratio of sum of titanium atom and silicon atom to magnesium atom ((Ti+Si)/Mg).

The solid product formed by the reduction is separated from liquid and several times washed with inert hydrocarbon solvent such as hexane, heptane or the like.

The solid product thus obtained contains trivalent titanium, magnesium and hydrocarbyloxy group, and it is usually amorphous or very weakly crystalline. Amorphous structure is particularly preferable from the viewpoint of catalyst activity.

Next, the solid product obtained in the above-mentioned manner is treated with an ester compound.

The ester compound is used in an amount of 0.1 to 50 moles, preferably 0.3 to 20 moles, and particularly 0.5 to 10 moles, per one mole of titanium atom in the solid product.

Per one mole of magnesium atom in the solid product, the ester compound is used in an amount of 0.01 to 1.0 mole, and preferably 0.03 to 0.5 mole. If the amount of ester compound is too large, disintegration of particle takes place.

The treatment of solid product with the ester compound can be practiced by any known methods, such as slurry process, mechanical pulverization using ball mill, and the like, so far as both the materials can be brought into contact by the method. However, mechanical pulverization is undesirable from the industrial point of view because it generates a large amount of fine powder in the solid catalyst component and thereby broadens particle size distribution. Preferably, both the materials are contacted in the presence of a diluent.

As said diluent, aliphatic hydrocarbons such as pentane, hexane, heptane, octane and the like, aromatic hydrocarbons such as benzene, toluene, xylene and the like, alicyclic hydrocarbons such as cyclohexane, cyclopentane and the like, and halogenated hydrocarbons such as 1,2-dichloroethane, monochlorobenzene and the like can be used. Among them, aromatic hydrocarbons and halogenated hydrocarbons are particularly preferable.

The diluent is used in an amount of 0.1 ml to 1,000 ml, preferably 1 ml to 100 ml, per one gram of the solid product. Temperature of the treatment is −50° C. to 150° C., and preferably 0° C. to 120° C. Time period of the treatment is 10 minutes or longer, and preferably 30 minutes to 30 hours. After completion of the treatment, the mixture is allowed to stand for the sake of separating liquid from solid, and thereafter the solid is several times washed with an inert hydrocarbon solvent to obtain an ester-treated solid product.

Then, the ester-treated solid product is treated with a mixture of an ether compound and titanium tetrachloride. Preferably, this treatment is carried out in a state of slurry. As the solvent used for making a slurry, aliphatic hydrocarbons such as pentane, hexane, heptane, octane, decane and the like, aromatic hydrocarbons such as toluene, xylene and the like, alicyclic hydrocarbons such as cyclohexane, methylcyclohexane, decalin and the like, and halogenated hydrocarbons such as dichloroethane, trichloroethane, trichloroethane, monochlorobenzene, dichlorobenzene, trichlorobenzene and the like can be used. Among them, halogenated hydrocarbons and aromatic hydrocarbons are preferable.

Concentration of the slurry is 0.05 to 0.7 g solid/ml solvent, and preferably 0.1 to 0.5 g solid/ml solvent. Temperature of the reaction is 30° C. to 150° C., preferably 45° C. to 120° C., and particularly 60° C. to 100° C. Although time period of the reaction is not critical, it is usually 30 minutes to 6 hours.

As the method for feeding the ester-treated solid product, the ether compound and titanium tetrachloride, any of a method which comprises adding an ether compound and titanium tetrachloride to an ester-treated solid product and an inverse method which comprises adding an ester-treated solid product to a solution of ether compound and titanium tetrachloride may be adopted.

In the method of adding ether compound and titanium tetrachloride to ester-treated solid product, a method which comprises adding ether compound and thereafter adding titanium tetrachloride and a method which comprises simultaneously adding ether compound and titanium tetrachloride are preferable. A method which comprises adding a previously prepared mixture of ether compound and titanium tetrachloride to ester-treated solid product is particularly preferable.

The reaction of ester-treated solid product with ether compound and titanium tetrachloride may be repeated twice or more. From the viewpoint of catalyst activity and stereospecificity, it is preferable to repeat the reaction using a mixture of ether compound and titanium tetrachloride at least twice.

The ether compound is used in an amount of 0.1 to 100 moles, preferably 0.5 to 50 moles, and particularly 1 to 20 moles, per one mole of titanium atom present in the solid product.

The titanium tetrachloride is added in an amount of 1 to 1,000 moles, preferably 3 to 500 moles, and particularly 10 to 300 moles, per one mole of titanium atom present in the solid product. Per one mole of ether compound, the titanium tetrachloride is added in an amount of 1 to 100 moles, preferably 1.5 to 75 moles, and particularly 2 to 50 moles.

The treatment of ester-treated solid product using a mixture of ether compound and titanium tetrachloride may be carried out in the presence of an ester compound. For this purpose, the ester compound is used in an amount of 30 moles or less, preferably 15 moles or less, and particularly 5 moles or less, per one mole of titanium atom present in the solid product.

The trivalent titanium compound-containing solid catalyst component obtained by the above-mentioned method is separated from liquid material, washed several times with inert hydrocarbon solvent such as hexane, heptane and the like, and then put to use in polymerization reaction.

From the viewpoint of catalyst activity and stereospecificity, it is preferable to put the solid catalyst component to use after separating it from liquid, once washing it with a large amount of halogenated hydrocarbon solvent such as monochlorobenzene or the like or aromatic hydrocarbon solvent such as toluene and the like, and several times washing it with an aliphatic hydrocarbon solvent such as hexane or the like.

The solid catalyst component of this invention is used in the polymerization of olefins in combination with an organoaluminum compound and, optionally, additionally with an electron donor. Concrete examples of said organoaluminum compound and electron donor are mentioned below.

(g) Organoaluminum compound

The organoaluminum compound used in this invention in combination with the above-mentioned solid catalyst is that having at least one aluminum-carbon bond in molecule. Its typical examples are represented by the following general formulas:

$$R^{14}_r AlY_{3-r}$$

$$R^{15}R^{16}Al-O-AlR^{17}R^{18}$$

wherein $R^{14}$, $R^{15}$, $R^{16}$, $R^{17}$ and $R^{18}$ each represents a hydrocarbon group having 1 to 20 carbon atoms, Y represents halogen atom, hydrogen atom or alkoxy group, and r represents a number satisfying $2 \leq r \leq 3$.

Concrete examples of the organoaluminum compound include trialkylaluminums such as triethylaluminum, triisobutylaluminum, trihexylaluminum and the like; dialkylaluminum hydrides such as diethylaluminum hydride, diisobutylaluminum hydride and the like; mixtures of trialkylaluminum and dialkylaluminum halide; mixtures of trialkylaluminum and alkylaluminum alkoxide; and alkylalumoxanes such as tetraethyldialumoxane, tetrabutyldialumoxane and the like.

Among these organoaluminum compounds, trialkylaluminums, mixtures of trialkylaluminum and dialkylaluminum halide, and alkylalumoxanes are preferable, and triethylaluminum, triisobutylaluminum, mixture of triethylaluminum and diethylaluminum chloride, and tetraethyldialumoxane are particularly preferable.

The amount of said organoaluminum compound can be selected from so wide a range as 1 to 1,000 moles per one mole of titanium atom present in the solid catalyst component. Preferably, however, its amount is in the range of 5 to 600 moles.

(h) Silicon compound

The silicon compound [component (C)] used in this invention at the time of polymerization is represented by the following general formula:

$$R^2R^3Si(OR^4)_2$$

wherein $R^2$ represents an alicyclic hydrocarbon group having 5 to 20 carbon atoms, $R^3$ represents an acyclic hydrocarbon group having 2 to 12 carbon atoms, and $R^4$ represents a hydrocarbon group having 1 to 20 carbon atoms.

Concrete examples of said silicon compound include the followings:

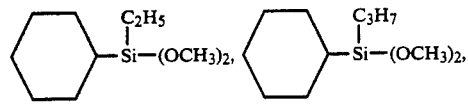
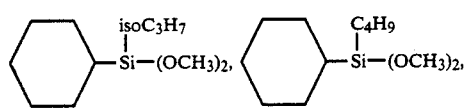
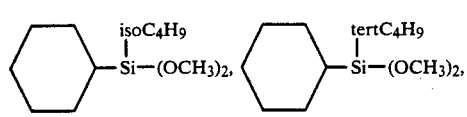
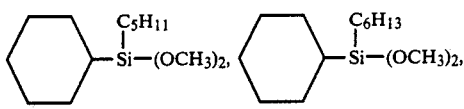
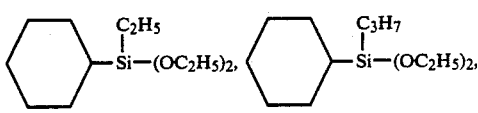
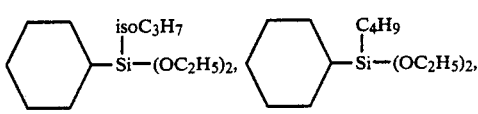
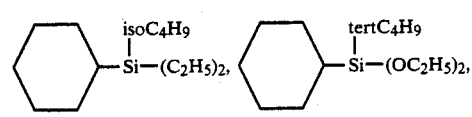
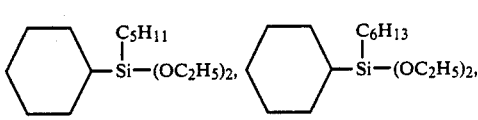
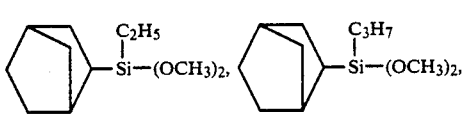
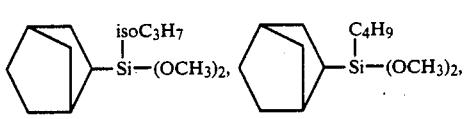
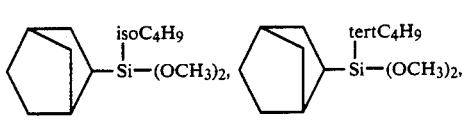
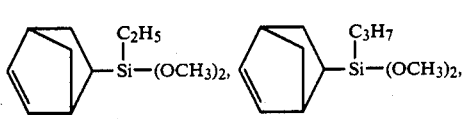
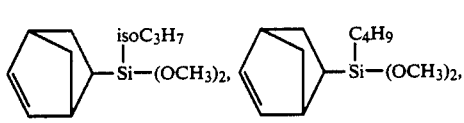
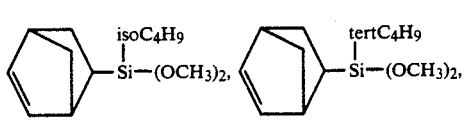
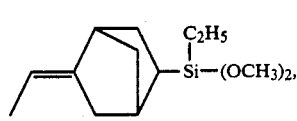
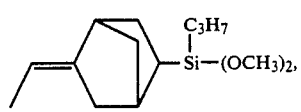
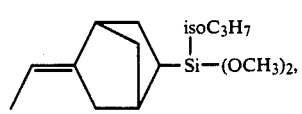

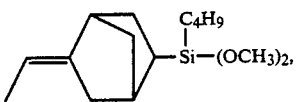

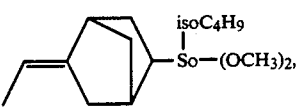

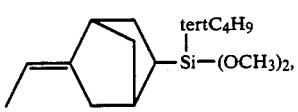

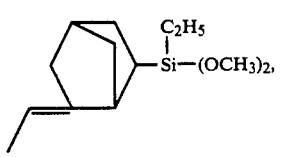 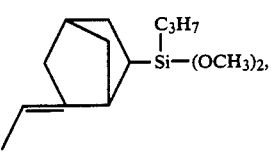

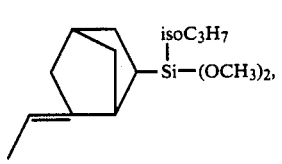 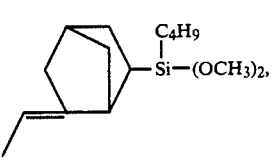

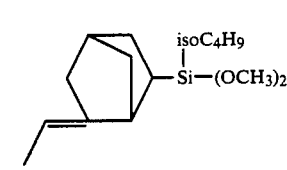 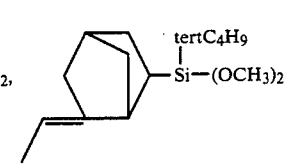

Among these silicon compounds, those wherein $R^2$ is an alicyclic hydrocarbon group having 6 to 10 carbon atoms, $R^3$ is an acyclic hydrocarbon group having 2 to 8 carbon atoms and $R^4$ is a hydrocarbon group having 1 to 10 carbon atoms are preferable, and those wherein $R^2$ is cyclohexyl group, $R^3$ is an acyclic hydrocarbon group having 2 to 6 carbon atoms and $R^4$ is methyl or ethyl group are more preferable, and cyclohexylethyldimethoxysilane is particularly preferable.

(i) Method for polymerizing olefins catalyst components into polymerization reactor is not critical, provided that they must be fed in an inert gas such as nitrogen, argon or the like in a moisture-free state.

The solid catalyst component, the organoaluminum compound and the electron donor may be fed either separately or after previously contacting two of them.

The polymerization can be carried out at a temperature ranging from $-30°$ C. to $300°$ C. Although pressure of the polymerization is not critical, a pressure of about 3 to about 2,000 atmospheres is preferable from the viewpoint of industrial practicability and economicity. The polymerization may be carried out either continuously or batch-wise. Slurry polymerization or solution polymerization using an inert hydrocarbon solvent such as propane, butane, pentane, hexane, heptane, octane and the like, liquid phase polymerization using no solvent, and gas phase polymerization are also adoptable.

Next, the olefins to which this invention is applicable are those having two or more carbon atoms. Concrete examples of said olefin include ethylene, propylene, butene-1, pentene-1, hexene-1, 3-methyl-pentene-1, 4-methyl-pentene-1, octene-1, decene-1, dodecene-1 and the like, though this invention is by no means limited by these olefins. The polymerization of this invention may be any of homopolymerization and copolymerization. In the copolymerization, two or more kinds of olefins are mixed together and contacted with catalyst to form a copolymer. Hetero-block copolymerization in which a polymerization is carried out in two or more steps can also be practiced easily. It is also possible to add a chain transfer agent such as hydrogen or the like for the purpose of regulating the molecular weight of polymer.

Hereunder, this invention will be illustrated in more detail by way of the following examples and comparative example.

EXAMPLE 1

(a) Synthesis of organomagnesium compound

After replacing the inner atmosphere of a one liter flask equipped with a stirrer, a reflux condenser, a dropping funnel and a thermometer with argon gas, 32.0 g of sliced metallic magnesium for Grignard reaction was thrown into the flask. Then, 120 g of butyl chloride and 500 ml of dibutyl ether were charged into the dropping funnel, and about 30 ml of the mixture was dropped onto the magnesium present in the flask to start a reaction. After starting the reaction, dropping was continued over a period of 4 hours at $50°$ C. After dropping the mixture, the reaction was continued for an additional one hour at $60°$ C. Then, the reaction mixture was cooled to room temperature, and solid matter was filtered off.

Butylmagnesium chloride dissolved in dibutyl ether was hydrolyzed with 1N sulfuric acid, and the excessive sulfuric acid was back-titrated with 1N aqueous solution of sodium hydroxide to determine the concentration of butylmagnesium chloride, by using phenolphthalein as an indicator. As the result, its concentration was 2.1 mole/liter.

(b) Synthesis of solid product

After replacing the inner atmosphere of a 500 ml flask equipped with a stirrer and a dropping funnel with argon gas, 240 ml of hexane, 5.4 g (15.8 mmoles) of tetrabutoxytitanium and 61.4 g (295 mmoles) of tetraethoxysilane were charged into the flask and made into a uniform solution. Then, 150 ml of the organomagnesium compound synthesized in (a) was slowly dropped into the flask from the dropping funnel over a period of 4 hours, while keeping inner temperature of the flask at $5°$ C. After dropping it, the resulting mixture was stirred at room temperature for an additional one hour, and the solid matter was separated from liquid at room temperature, thrice washed with each 240 ml portion of hexane and dried under reduced pressure to obtain 45.0 g of a brown-colored solid product.

The solid product thus obtained contained 1.7% by weight of titanium atom, 33.8% by weight of ethoxy group, and 2.9% by weight of butoxy group.

In the wide angle X ray diffraction pattern (Cu—Ka ray) of this solid product, no clear diffraction pattern was observable at all, demonstrating its amorphous structure.

(c) After replacing the inner atmosphere of a 100 ml flask with argon gas, 6.5 g of the solid product synthesized in (b), 16.2 ml of toluene and 4.3 ml (16 mmoles) of diisobytyl phthalate were charged into the flask and reacted at $95°$ C. for one hour.

After the reaction, the solid product was separated from liquid and thrice washed with each 33 ml portion of toluene.

(d) Synthesis of solid catalyst component (activating treatment)

After completing the above-mentioned washing step of (c), 16.2 ml of toluene, 0.36 ml (1.3 mmoles) of diisobutyl phthalate, 2.2 ml (13 mmoles) of butyl ether and 38.0 ml (346 mmoles) of titanium tetrachloride were charged into the flask and reacted at 95° C. for 3 hours. After the reaction, the solid matter was separated from liquid at 95° C. and twice washed with each 33 ml portion of toluene at that temperature. Then, the above-mentioned treatment using a mixture of diisobutyl phthalate, butyl ether and titanium tetrachloride was repeated once more under the same conditions as above, and the solid was thrice washed with each 33 ml portion of hexane to obtain 5.0 g of an ocher-colored solid catalyst component.

The solid catalyst component thus obtained contained 2.1% by weight of titanium atom, 19.9% by weight of magnesiumatom and 12.7% by weight of phthalic ester.

(e) Polymerization of propylene

After replacing the inner atmosphere of an agitation type stainless steel autoclave having a capacity of 3 liters with argon gas, 2.6 mmoles of triethylaluminum, 0.39 mmole of cyclohexylethyldimethoxysilane and 10.5 mg of the solid catalyst component synthesized in (c) were charged into the autoclave, and thereafter hydrogen was introduced until its partial pressure reached 0.33 kg/cm$^2$. Then, 780 g of liquefied propylene was charged, temperature of autoclave was elevated to 80° C., and polymerization was carried out at 80° C. for 2 hours. After the polymerization, the unreacted monomer was purged. The resulting polymer was dried under reduced pressure at 60° C. for 2 hours. Thus, 232 g of powdery polypropylene was obtained.

This means that yield of polypropylene (kg) per one gram titanium atom in the solid catalyst component (hereinafter, abbreviated to PP/Ti) was equal to 1,900. Proportion (% by weight) of cold xylene-soluble fraction in total polymer yield (hereinafter, abbreviated to CXS) was equal to 0.9. Bulk density of the powdery polypropylene (g/ml) (hereinafter abbreviated to BD) was equal to 0.44.

COMPARATIVE EXAMPLES 1-8

Propylene was polymerized in the same manner as in Example 1, except that the silicon compound [component (C)] shown in Table 1 was used.

In these comparative examples, stereospecificity was very low and catalyst activity was low, because the component (C) used there was out of this invention.

COMPARATIVE EXAMPLE 9

(a) Synthesis of solid catalyst component

A suspension was prepared by reacting 47.6 g (500 mmoles) of anhydrous magnesium chloride, 250 ml of decane and 234 ml (1,500 mmoles) of 2-ethylhexyl alcohol at 130° C. for 2 hours. Then, 11.1 g (75 mmoles) of phthalic anhydride was added and stirred at 130° C. for one hour to dissolve it into the suspension. The uniform solution thus prepared was cooled to room temperature, and its whole quantity was dropwise added in one hour into 2,000 ml (18 moles) of titanium tetrachloride kept at −20° C. The resulting mixture was heated to 110° C. in 4 hours. When its temperature had reached 110° C., 28.0 ml (140 mmoles) of diisobutyl phthalate was added, and the resulting mixture was stirred at that temperature for 2 hours. After completion of the reaction, the solid material was collected by filtration while it was hot, and the solid was again suspended into 2,000 ml of titanium tetrachloride and reacted at 110° C. for 2 hours. After the reaction, the solid material was collected by filtration while it was hot, washed at 110° C. five times with each 300 ml portion of decane and then at room temperature thrice with each 500 ml portion of hexane, and dried under reduced pressure to obtain a solid catalyst component. The solid catalyst thus obtained contained 2.0% by weight of titanium atom, 20.0% by weight of magnesium atom, and 4.2% by weight of diisobutyl phthalate.

(b) Polymerization of propylene

Propylene was polymerized in the same manner as in Example 1 (e), except that the solid catalyst component synthesized in Comparative Example 9 (a) was used. Results of the polymerization were as follows: PP/Ti=1,540, CXS=2.4, BD=0.36.

In this comparative example, stereospecificity was very low and activity was low, because the solid catalyst component used there was ut of this invention.

COMPARATIVE EXAMPLE 10

Propylene was polymerized in the same manner as in Comparative Example 9 (b), except that phenyltrimethoxysilane was used as silioon compound [component (C)].

Results were as follows: PP/Ti=1,040, CXS=4.1, BD=0.36.

In this example, stereospecificity and activity were very low, because the solid catalyst component and component (C) used there were out of this invention.

COMPARATIVE EXAMPLE 11

(a) Synthesis of solid catalyst component

Into a 500 ml flask equipped with a stirrer and a discharging tube were charged 10.4 g of anhydrous magnesium chloride, 16.7 g of anhydrous ethyl alcohol and 246 ml of decane in an atmosphere of argon gas at room temperature.

Then, the mixture was heated at 120° C. with stirring to prepare an adduct of magnesium chloride and 3 moles of ethyl alcohol. The adduct was in a molten state, and it formed a mixture with the dispersing medium (decane). Then, inner pressure of the flask was elevated by introducing argon gas.

The dispersion was transferred through the discharging tube into a one liter flask containing 530 ml of anhydrous heptane which was stirred and kept at an initial temperature of −40° C. by external cooling.

The solid product forming the dispersed phase of the emulsion was separated by twice filtering the emulsion, washed with 530 ml of heptane and dried under reduced pressure to obtain 11.9 g of a solid adduct MgCl$_2$·2.5C$_2$H$_5$OH.

After replacing the inner atmosphere of a 200 ml flask with argon gas, 78 ml (0.71 mole) of titanium tetrachloride and 0.80 g (2.9 mmoles) of diisobutyl phthalate were fed and mixed together, into which 6.05 g of the above-mentioned MgCl$_2$·2.5C$_2$H$_5$OH adduct was added at 20° C. The whole mixture was heated to 100° C. and kept at this temperature for 2 hours, after which it was filtered at 100° C. The solid product thus obtained was treated with 78 ml (0.71 mole) of titanium tetrachloride at 120° C. over a period of 2 hours. After the treatment, titanium tetrachloride was filtered off, and the residue was thrice washed with each 78 ml portion of n-heptane at 90° C. and then twice washed with each 78 ml portion of n-heptane at 20° C., after which it was dried under reduced pressure to obtain 3.14 g of a solid catalyst component.

The solid catalyst component contained 2.8% by weight of titanium atom, 0.5% by weight of ethanol, and 7.2% by weight of phthalic ester.

(b) Polymerization of propylene

Propylene was polymerized in the same manner as in Example 1 (e), except that the solid catalyst component synthesized in (a) of this comparative example was used. Results were as follows: PP/Ti=1,710, CXS=2.3, BD=0.33.

In this comparative example, stereospecificity was very low, because the solid catalyst component used there was out of this invention.

COMPARATIVE EXAMPLE 12

Propylene was polymerized in the same manner as in Comparative Example 11 (b), except that phenyltrimethoxysilane was used as silicon compound [component (C)].

Results of the polymerization were as follows: PP/Ti=1,050, CXS=2.9, BD=0.33.

In this example, stereospecificity and activity were very low, because the solid catalyst component and component (C) used there were out of this invention.

COMPARATIVE EXAMPLE 13

(a) Synthesis of solid catalyst component

After replacing the inner atmosphere of a 100 ml flask equipped with a stirrer with argon gas, 37.5 ml of heptane, 37.5 ml of tetrabutoxytitanium and 5 g of anhydrous magnesium chloride were charged and heated to 90° C. in 2 hours to dissolve the magnesium chloride completely. Then, the flask was cooled to 40° C., 7.5 ml of methylhydrogenpolysiloxane was added, and the resulting solution was transferred into 200 ml of heptane kept at $-20°$ C. to deposit magnesium chloride-titanium tetrabutoxide complex. After washing it four times with each 30 ml portion of heptane, it was mixed with 4.4 ml of silicon tetrachloride and 0.7 ml of diisobutyl phthalate ad kept at 50° C. for 2 hours. Then, it was four times washed with each 30 ml portion of heptane. After adding 12.5 ml of titanium tetrachloride thereto, it was kept at 90° C. for 2 hours. It was seven times washed with each 30 ml portion of heptane and dried under reduced pressure to obtain 0.99 g of a solid catalyst component.

The solid catalyst component contained 7.4% by weight of titanium atom and 35.3% by weight of phthalic ester.

(b) Polymerization of propylene

Propylene was polymerized in the same manner as in Example 1 (e), except that the solid catalyst component synthesized in (a) of this example was used.

Results of the polymerization were as follows: PP/Ti=270, CXS=1.2, BD=0.26.

In this example, stereospecificity and activity were low, because the solid catalyst component used there was out of this invention.

COMPARATIVE EXAMPLE 14

Propylene was polymerized in the same manner as in Comparative Example 13 (b), except that phenyltrimethoxysilane methoxysilane was used as silicon compound [component (C)].

Results of the polymerization were as follows: PP/Ti=210, CXS=1.2, BD=0.26.

In this example, stereospecificity and activity were low, because the solid catalyst component and component (C) used there were out of this example.

COMPARATIVE EXAMPLE 15

Propylene was polymerized in the same manner as in Comparative Example 13 (b), except that cyclohexylmethyldimethoxysilane was used as silicon compound [component (C)].

Results of the polymerization were as follows: PP/Ti=324, CXS=1.2, BD=0.26.

In this example, stereospecificity and activity were low, because the solid catalyst component and component (C) used there were out of this invention.

EXAMPLE 2

Propylene was polymerized in the same manner as in Example 1 (e), except that the amount of cyclohexylethyldimethoxysilane used in the polymerization was altered to 1.04 mmoles.

Results were as follows: PP/Ti=1,810, CXS=0.6, BD=0.44.

EXAMPLE 3

(a) Synthesis of solid product

After replacing the inner atmosphere of a 200 ml flask equipped with a stirrer and a dropping funnel with argon gas, 6.98 g of styrene-divinylbenzene copolymer (dVp=0.51 ml/g, wherein dVp expresses pore volume in the pore radius range of 200 to 2,000 angstroms) which had been dried under reduced pressure at 80° C. for one hour was fed together with 35.0 ml of n-heptane, 0.64 g (1.9 mmoles) of tetrabutoxytitanium and 6.70 g (32.1 mmoles) of tetraethoxysilane. The mixture was stirred at 30° C. for 45 minutes.

Then, 16.9 ml of the organomagnesium compound synthesized in Example 1 (a) was dropped from the dropping funnel in one hour, while keeping inner temperature of the flask at 5° C. After dropping it, content of the flask was stirred at 5° C for 45 minutes and then at 30° C for 45 minutes, and the product was thrice washed with each 35 ml portion of n-heptane and dried under reduced pressure. Thus, 12.4 g of a brown colored solid product was obtained.

This solid product contained 0.47% by weight of titanium atom and 4.0% by weight of magnesium atom.

(b) Synthesis of solid catalyst component

After replacing the inner atmosphere of a 100 ml flask with argon gas, 4.58 g of the solid product obtained in the reduction of (a), 15.3 ml of toluene and 1.40 ml (5.23 mmoles) of diisobutyl phthalate were charged and reacted at 95° C. for one hour.

After the reaction, solid matter was separated from liquid and twice washed with each 15.3 ml portion of toluene.

After washing it, 15.3 ml of toluene, 1.01 ml (5.97 mmoles) of n-butyl ether and 17.9 ml (163 mmoles) of titanium tetrachloride were fed into the flask and reacted at 95° C. for 3 hours. After the reaction, solid matter was separated from liquid and twice washed at that temperature with each 15.3 ml portion of toluene. Then, the above-mentioned treatment using a mixture of n-butyl ether and titanium tetrachloride was repeated once more over a period of one hour, and the product was twice washed with each 15.3 ml portion of n-heptane and dried under reduced pressure. Thus, 3.68 g of a brown-colored solid catalyst component was obtained.

The solid catalyst component contained 0.49% by weight of titanium atom, 5.4% by weight of magnesium atom and 1.5% by weight of phthalic ester.

(c) Polymerization of propylene

Propylene was polymerized in the same manner as in Example 1 (e), except that the solid catalyst component synthesized in (b) of this example was used. Results of the polymerization were as follows: PP/Ti=1,860, CXS=1.1, BD =0.42.

EXAMPLE 4

Using an autoclave having a capacity of 5 liters and equipped with a stirrer, a homopolymerization of propylene was carried out in the first step, and a random copolymerization of ethylene and propylene was carried out in the second step.

Thus, after drying the autoclave at 80° C. for one hour, it was brought into a reduced pressure with vacuum pump. Then, 4.4 mmoles of triethylaluminum, 0.66 mmoles of cyclohexylethyldimethoxysilane and 13.6 mg of the solid catalyst component synthesized in Example 1 (C) were charged, after which hydrogen was introduced until its partial pressure reached 0.53 kg/cm².

Subsequently, 1.3 kg of liquefied propylene was fed into the autoclave with pressure, and its temperature was elevated to 70° C. After carrying out homopolymerization of propylene at 70° C. for 35 minutes, the unreacted monomer was purged. Then, a small quantity of polymer was sampled out for the sake of measuring $[\eta]_p$ and CXS. Then, 0.1 kg/cm² of hydrogen was fed, the pressure was elevated with propylene to 6 kg/cm²G, pressure was further elevated to 10 kg/cm²G with ethylene, and a polymerization of the second step was started at a controlled temperature of 70° C.

Thereafter, ethylene/propylene gas phase copolymerization was carried out for 20 minutes, while feeding an ethylene/propylene gas mixture (50%/50% by volume) so as to maintain a total pressure of 10 kg/cm²G.

After completing the polymerization, the unreacted monomers were purged, and there was obtained 337 g of a block copolymer which had good powder characteristics and was free from both fine powder and coarse powder.

Further, examination of the opened autoclave revealed that there was noticeable no deposition of polymer at all on the inner wall and stirrer.

The total polymer formed (kg) per 1 g of titanium atom present in the solid catalyst component was 1,180. The propylene homopolymer formed in the first step had CXS of 0.9% by weight.

The total polymer contained 35% by weight of ethylene/propylene copolymer formed in the second step. The ethylene/propylene copolymer contained 48% by weight of ethylene unit.

Molecular weights were as follows: $[\eta]_p=2.4$, $[\eta]_{Ep}=2.2$, $[\eta]_T=2.3$.

TABLE 1

| | Component (C) | (C)/Triethyl-aluminum (mol/mol) | PP/Ti (kg/g) | CXS (% by wt.) | BD (g/ml) |
|---|---|---|---|---|---|
| Example 1 | cyclohexyl—Si(C₂H₅)(OCH₃)₂ | 0.15 | 1900 | 0.9 | 0.44 |
| Comparative Example 1 | cyclohexyl—Si(OCH₃)₃ | " | 1170 | 1.4 | " |
| Comparative Example 2 | phenyl—Si(OCH₃)₃ | " | 1050 | 1.5 | " |
| Comparative Example 3 | isoC₄H₉—Si—(OCH₃)₃ | " | 1050 | 1.5 | " |
| Comparative Example 4 | (cyclohexyl)₂—Si(OCH₃)₂ | " | 1490 | 1.7 | " |
| Comparative Example 5 | (phenyl)₂—Si(OCH₃)₂ | " | 1770 | 1.3 | " |
| Comparative Example 6 | cyclohexyl—Si(CH₃)(OCH₃)₂ | " | 1800 | 1.3 | " |

TABLE 1-continued

| | Component (C) | (C)/Triethyl-aluminum (mol/mol) | PP/Ti (kg/g) | CXS (% by wt.) | BD (g/ml) |
|---|---|---|---|---|---|
| Comparative Example 7 | 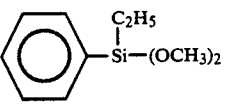 | 0.15 | 952 | 1.4 | 0.44 |
| Comparative Example 8 | $(C_2H_5)_2-Si-(OCH_3)_2$ | " | 1790 | 1.6 | " |

What is claimed is:

1. A catalyst system for hommopolymerization or copolymerization of an α-olefin, or copolymerization of an α-olefin with ethylene comprising:
   (A) a solid catalyst component containing a trivalent titanium compound obtained by reducing a titanium compound represented by the following general formula:

$$Ti(OR^1)_nX_{4-n}$$

($R^1$ represents a hydrocarbon group having 1 to 20 carbon atoms, X represents a halogen atom and n represents a number satisfying $0<n\leq 4$) with an organomagnesium compound in the presence of an organic silicon compound having Si—O bond to obtain a solid product, followed by treating the solid product with an ester compound and thereafter treating the ester-treated solid product with a mixture of an ether compound and titanium tetrachloride or a mixture of an ether compound, titanium tetrachloride and an ester compound,
   (B) an organoaluminum compound, and
   (C) a silicon compound represented by the following general formula:

$$R^2R^3Si(OR^4)_2$$

($R^2$ represents an alicyclic hydrocarbon group having 5 to 20 carbon atoms, $R^3$ represents an acyclic hydrocarbon group having 2 to 12 carbon atoms, and $R^4$ represents a hydrocarbon group having 1 to 20 carbon atoms), wherein the organic silicon compound having Si—O bond is one represented by the general formulas:

$$Si(OR^5)_mR^6_{4-m}$$
   $$R^7(R^8_2SiO)_pSiR^9_3 \text{ or}$$
   $$(R^{10}_2SiO)_q$$

wherein $R^5$ represents a hydrocarbon group having 1 to 20 carbon atoms, $R^6$, $R^7$, $R^8$, $R^9$ and $R^{10}$ each represents a hydrocarbon group having 1 to 20 carbon atoms or hydrogen atom, m represents a number satisfying $0<m\leq 4$, p represents an integer of 1 to 1,000, and q represents an integer of 2 to 1,000, the ester compound is selected from the group consisting of aliphatic carboxylic esters, olefinic carboxylic esters, alicyclic carboxylic esters and aromatic carboxylic esters; and the ether compound is a dialkyl ether.

2. A catalyst system according to claim 1, wherein the hydrocarbon group having 1 to 20 carbon atoms is an alkyl group having 2 to 18 carbon atoms or aryl group having 6 to 18 carbon atoms, the halogen atom is chlorine, bromine or iodine, and n is a number satisfying $2\leq n\leq 4$ in the general formula of titanium compound.

3. A catalyst system according to claim 1, wherein the organic silicon compound is one represented by the general formula $$Si(OR^5)_mR^6_{4-m}$$

where $R^5$ and $R^6$ are as defined above and m satisfies $1\leq m\leq 4$.

4. A catalyst system according to claim 1, wherein the organomagnesium compound is Grignard compound represented by general formula $R^{11}MgX$ ($R^{11}$ represents a hydrocarbon group having 1 to 20 carbon atoms and X represents a halogen atom), or dialkylmagnesium compounds or diarylmagnesium compounds represented by general formula $R^{12}R^{13}Mg$ ($R^{12}$ and $R^{13}$ each represents a hydrocarbon group having 1 to 20 carbon atoms).

5. A catalyst system according to claim 4, wherein the Grignard compound is one represented by the general formula $R^{11}MgCl$, where $R^{11}$ is as defined above.

6. A catalyst system according to claim 1, wherein the ester compound is methacrylic esters, maleic esters or phthalic esters.

7. A catalyst system according to claim 1, wherein the, dialkyl ether is dibutyl ether or diisoamyl ether.

8. A catalyst system according to claim 1, wherein the organoaluminum compound is one represented by the general formulas $$R^{14}_rAlY_{3-r}, \text{ or}$$
$$R^{15}R^{16}Al-O-AlR^{17}R^{18}$$

wherein $R^{14}$, $R^{15}$, $R^{16}$, $R^{17}$ and $R^{18}$ each represents a hydrocarbon group having 1 to 20 carbon atoms, Y represents halogen atom, hydrogen atom or alkoxy group, and r represents a number satisfying $2\leq r\leq 3$.

9. A catalyst system according to claim 1, wherein the silicon compound (component C) represented by the general formula, $R^2R^3Si(OR^4)_2$, is

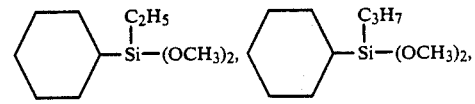

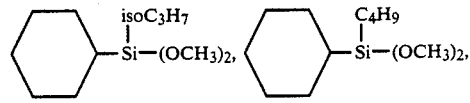

-continued

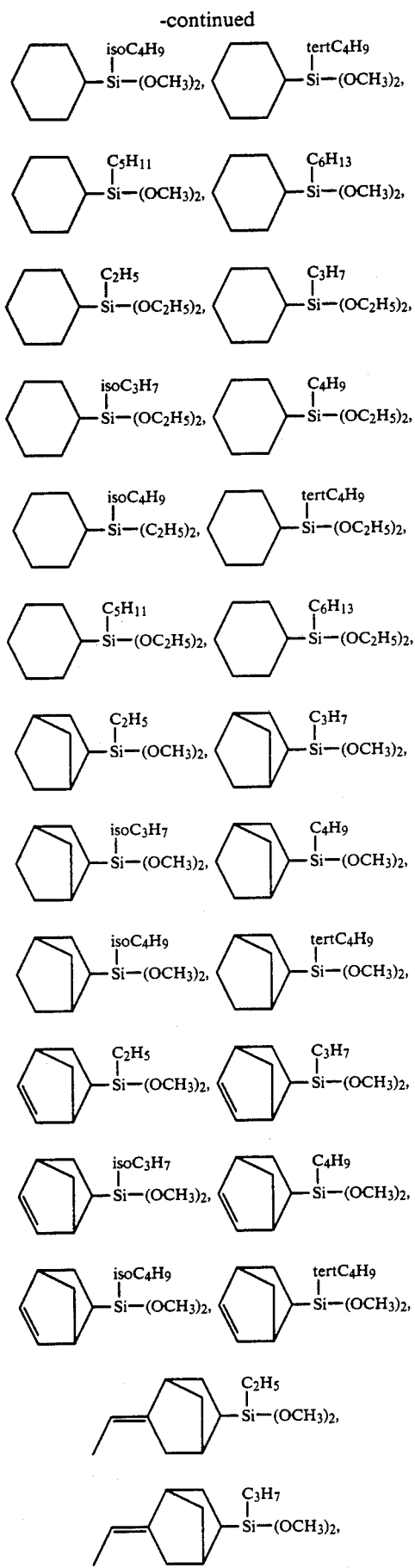
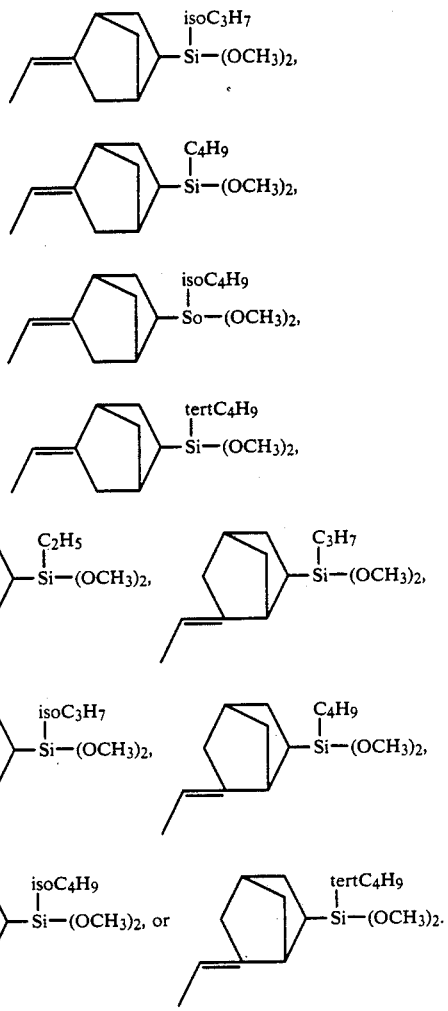

10. A catalyst system according to claim 1, wherein the reduction of titanium compound is carried out in the presence of a porous material.

11. A catalyst system according to claim 10, wherein the porous material is an inorganic oxide or organic polymer having a pore volume of 0.3 ml/g or above in the pore radius region of 200 to 2,000 Å and a mean particle diameter of 5 to 300 microns.

12. A catalyst system according to claim 11, wherein the porous inorganic oxide is $SiO_2$, $Al_2O_3$, MgO, $TiO_2$, $ZrO_2$, $SiO_2 \cdot Al_2O_3$, $MgO \cdot Al_2O_3$, or $MgO \cdot SiO_2 \cdot Al_2O_3$.

13. A catalyst system according to claim 11, wherein porous organic polymer is polystyrene type, polyacrylic ester type, polymethacrylic ester type, polyacrylonitrile type, polyvinyl chloride type or polyolefin type polymers.

14. A catalyst system according to claim 1, wherein the organomagnesium compound is used in an amount of 0.1 to 1.0 as expressed in terms of atomic ratio of sum of titanium atom and silicon atom t magnesium atom [(Ti+Si)/Mg].

15. A catalyst system according to claim 1, wherein the organic silicon compound is used in an amount of 1 to 50 as expressed in terms of atomic ratio of silicon atom to titanium atom (Si/Ti).

16. A catalyst system according to claim 1, wherein the ester compound for treating the solid product is used in an amount of 0.1 to 50 moles per one mole of titanium atom in the solid product.

17. A catalyst system according to claim 1, wherein the ester compound for treating the solid product is used in an amount of 0.01 to 1.0 mole per one mole of magnesium atom in the solid product.

18. A catalyst system according to claim 1, wherein the ether compound is used in an amount of 0.1 to 100 moles per one mole of titanium atom present in the solid product.

19. A catalyst system according to claim 1, wherein the titanium tetrachloride is added in an amount of 1 to 1,000 moles per one mole of titanium atom present in the solid product.

20. A catalyst system according to claim 1, wherein the ester compound for treating the ester-treated solid product is used in an amount of 30 moles or less per one mole of titanium atom present in the solid product.

21. A catalyst system according to claim 1, wherein the organoaluminum compound is used in an amount of 1 to 1,000 moles per one moles of titanium atom present in the solid catalyst component.

* * * * *